Patented Apr. 13, 1926.

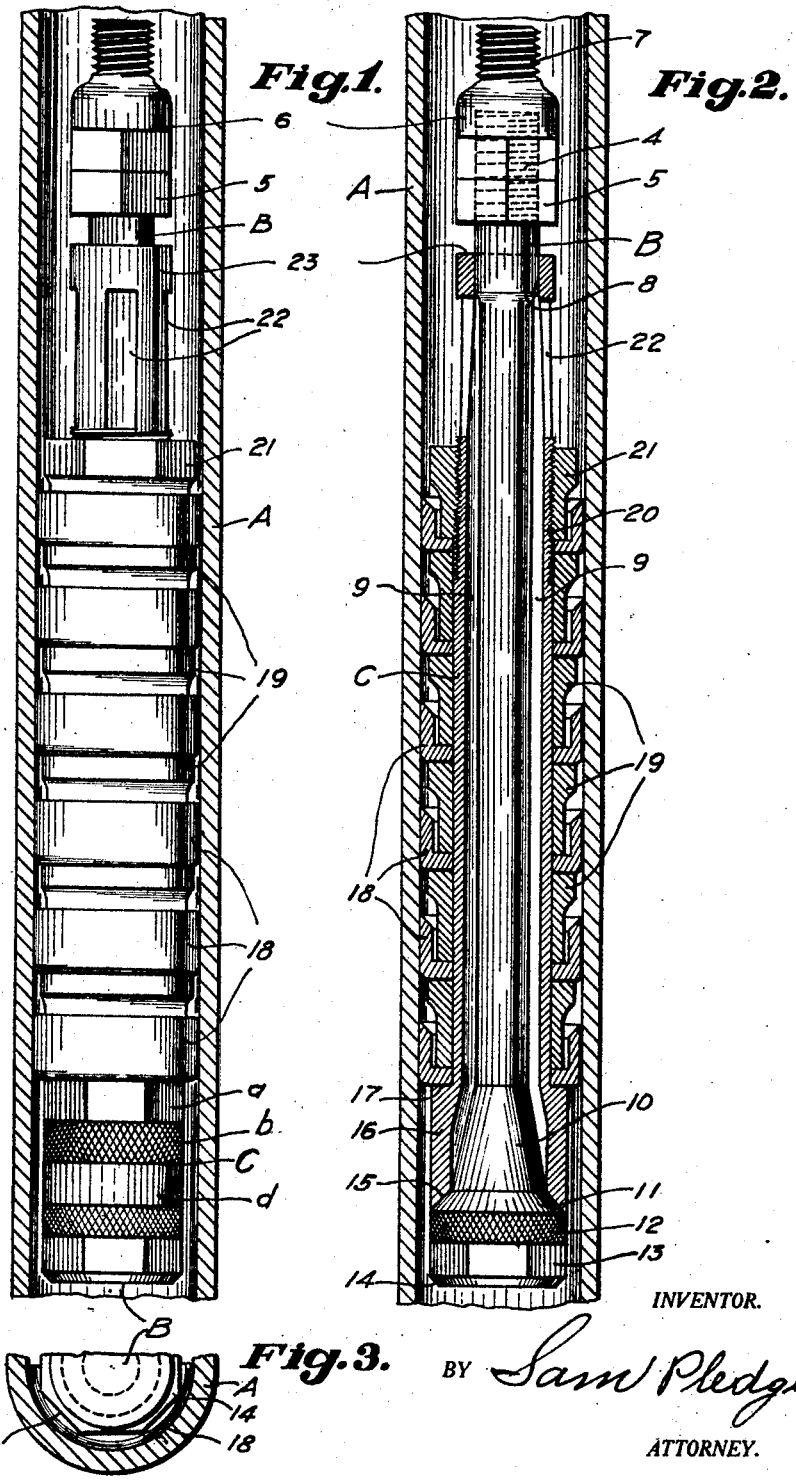

1,580,915

UNITED STATES PATENT OFFICE.

SAM PLEDGER, OF OKLAHOMA CITY, OKLAHOMA.

RECIPROCATING VALVE.

Application filed February 13, 1925. Serial No. 8,923.

*To all whom it may concern:*

Be it known that I, SAM PLEDGER, a citizen of the United States, residing at Oklahoma City, in the county of Oklahoma and State of Oklahoma, have invented certain new and useful Improvements in Reciprocating Valves, of which the following is a specification, reference being had to the accompanying drawings.

This invention relates to improvements in reciprocating valves and more in particular to tubular reciprocating valves for pumps whose plungers must operate in viscous liquids.

An important object of my invention is to provide a valve of this character that is positive in its action in such liquids as contain certain elements which tend to solidify and obstruct the passage of the said liquid.

A further object of my invention is to provide a valve of this character which will admit of but one setting and cannot be set wrong through ignorance or carelessness.

A still further object of my invention is to provide a valve of the character described having a rod or stem of one solid piece of metal directly connected with the pump rod or wire cable which operates to seat and unseat the valve.

Another object of my invention is to provide a valve whose stem will admit of rotation but still be positive in its seating, will work under heavy pressure and will be proof against obstruction by any ordinary foreign matter, the said rotation virtually constituting a selfgrinding valve.

A further object of my invention is to provide a valve of few simple wearing parts, so designed and assembled as to give the valve long life when working under adverse conditions.

A still further object is to provide a valve whose working barrel is so constructed that any number of packing elements may be used, within the limits of the valve, without disturbing its proper adjustment.

Another object of my invention is to provide a valve that can be operated upon a wire cable line, thus eliminating the usual pump or sucker rod.

A further object is to provide a valve with a smooth, easily traveled liquid passage, free from any sharp corners or sudden turns, thereby preventing any churning action upon the passing liquid.

Still other advantages and objects of my invention will appear and be better understood from that embodiment of my invention of which the following is a specification, reference being had to the accompanying drawing forming a part thereof, in which:

Figure 1 is a side elevation of my improved reciprocating valve in position within the pump cylinder.

Figure 2 is a longitudinal sectional view through the working barrel; and

Figure 3 is a partial bottom view of Figure 1.

Referring now more in particular to the drawings in which like reference characters designate like parts throughout, the letter A denotes a pump cylinder within which my improved valve is operatively mounted, B designates my valve stem mounted within the working barrel C. The valve stem B is screw-threaded at its upper end as shown at 4, to receive the lock nut 5 and connecting member 6, said member 6 being screw-threaded at 7 for connection with the pump rod or wire cable.

The length of the screw-threaded portion 4 is such that the lock nut 5 cannot be screwed down so as to change the proper clearance between the lower valve seat 11 and the upper valve seat 15. This eliminates any possibility of but one setting of the valve. The upper unthreaded portion of the said valve stem B serves as a guide for my hollow one piece working barrel C as shown at 23. The said valve stem B is reduced in diameter at 8 thereby enlarging the liquid passage or space 9, between the said stem B and the said hollow working barrel C. Near the lower end of my improved valve stem B is an enlargement 10, conical in shape, with a long taper, which serves as a guide to the lower end of my hollow working barrel C. Immediately below the said conical shaped enlargement 10 of valve stem B is the lower ground valve seat 11, also conical in shape, which terminates in a cylinder 12, whose circumferential edge is knurled. Directly below is part 13, octagonal in plan, said parts 12 and 13 being gripable by the hand or a wrench respectively. Finally the extreme lower end 14 of the valve stem B is a chamfered, circular, horizontal plane surface which prevents any injury to the check valve which may operate in the pump cylinder directly below this point. This arrangement of valve stem without any lock nut on the lower end, allows a longer stroke in any length well cylinder without coming in contact with and injuring any lower check valve at the bottom of the well. As can be readily seen in Fig. 2, since the said valve stem and lower valve seat are constructed of only one piece, this prevents any leakage between valve seat and stem when under high pressure. It will also be noted that the said valve stem B is free to rotate, thus making a selfgrinding valve which will prevent undue wear at any one place on the valve seat, and allow the pump rod or wire cable to turn and straighten any twists or kinks in these connections.

The working barrel C is mounted about the valve stem B, and at its lower end 15 is ground to conform to the valve seat 11, and thus form a tight joint at this point and prevent any leakage. The enlarged lower portion 16 of the said working barrel C provides an upwardly directed shoulder 17, upon which are supported in position about the said working barrel C, a plurality of packing rings 18, and spacers 19, these said packing elements serving to seal the space between the pump cylinder A and the working barrel C in the usual manner. Near its upper end the working barrel C is screw-threaded exteriorly as indicated at 20, for engagement by the hexagonal shaped member 21, for securely holding in position the said packing rings 18 and spacers 19.

On the exterior of the said enlarged lower portion 16 of the said working barrel C immediately below and adjacent the said shoulder 17, I provide a section "a", octagonal in plan, for applying a wrench and below this said section "a", is a knurled section "b", for gripping by the hand, thus providing a method of securely holding the hollow working barrel C while the said member 21 is screwed down upon the said packing elements 18 and 19. The lowermost section "d" of the said working barrel C, I have made a full cylinder in order to have ample metal to form the upper ground valve seat 15. Referring again to the threads at 20, it will be readily understood that the length of the screw-threaded portion can be regulated so as to vary the number of packing elements within the limits of the valve without in any way disturbing its proper adjustment.

Referring now to Fig. 2, it will be seen that the working barrel C has no screw threads or crevices to obstruct the free passage of any liquid, or hold any foreign matter which is likely to choke up the valve. Attention is also called to the well known fact that in the oil industry there are certain localities where a very fine sand is found in the crude oil. This mixture of oil and sand will, under pressure, enter any screw-threaded connection regardless of how tight the joint may be when first fitted. After a time the sand and oil will cut thru the screw-threaded connections with the comparative force of an acetylene torch. My improved valve prevents any such destructive action by eliminating all screw-threaded connections on the working barrel C, which are subjected to such cutting action by the flow of sand impregnated oil.

It will be noticed in Fig. 2, that immediately above the screw-threaded portion 20 of the working barrel C, I provide a plurality of long slotted openings 22, the combined cross-sectional areas of the said openings 22 being many times the area of the liquid passage 9 between the stem B and the working barrel C, thus allowing a free flow of the liquid. Especial attention is called to the fact that in my improved valve, all the movable parts are supported upon the solid, one piece, enlarged bottom member of the valve stem B, that the working barrel C, being supported by the said stem B, in turn supports upon shoulder 17 the packing elements 18 and 19, that member 21 and the screw-threads 20 are not under stress in the valve's operation, but merely hold the said packing elements in position, that the said working barrel C is of such size and shape that it will slip down over the said valve stem B, and that in turn the packing rings 18, the spacers 19 and the member 21 are so made as to slip down on the said working barrel C, and that finally, the only screw-threads under working stress are those at 4 and they are fully protected by the lock nut 5 and the member 6. I have by this arrangement provided a reciprocating valve of few working parts and no points of weakness due to exposed screw-threads. As a further protection to the screw-threaded portion at 4, the final termination of the upper end of the said working barrel C is in a broad, flat-topped, hollow, ring shaped member 23, which prevents wear on both the said member 23 and the protecting lock nut 5.

It will be noticed in Fig. 2, that the smooth, unobstructed liquid passage 9 formed around the stem B will offer little or no frictional resistance to the upward passage of the liquid through the said passage 9, while the downward pressure of the column of liquid above the working barrel C, exerting its pressure over the greater surface of the member 21, and the packing ring 18, will cause the valve to settle downwardly into the liquid confined above any closed lower check valve, thus making it possible to eliminate the usual pump or sucker rod and operate my improved valve on a wire cable line.

Since it is possible to thus operate my improved valve on a wire cable, it can be readily seen that the said valve can be removed from the well in about one-tenth the time required to disconnect the sections of the usual sucker rod, with a corresponding saving of time in replacing the said valve in the well. There are no sucker rods to become disconnected, no fishing for disconnected rods and no wasting of the valuable time of workmen and loss of production from an idle well.

In describing the operation of my improved reciprocating valve device, it can be readily seen that when the pump rod or wire cable is lowered until the lock nut 5 engages the ring member 23 of the working barrel C, the valve opening between the valve seats 11 and 15, will, at that time, be in its fully opened position. Upon further downward movement, the working barrel C will be carried downwardly and the liquid between the valve 11 and the lower check valve will pass upwardly through the smooth, unobstructed liquid passage 9, formed around the valve stem B, and out to a point above the working barrel C through the slotted openings 22. It is an undisputed fact that certain viscous liquids or liquids containing certain elements which tend to solidify easily, are irreparably injured by the churning action of being forced through passages having sharp edges and square turns. This churning action is practically eliminated by the smooth passage 9 within the working barrel C. The initial upward movement of the pump rod or cable will lift the valve stem B and cause the ground surface 11 to come into engagement with the upper ground valve seat 15 of the working barrel C, thus closing the lower end of the said working barrel C and retaining above the valve all the liquid which has passed through as just described.

Having thus fully described my invention, what I claim is:—

1. In a reciprocatory tubular valve, a solid one piece valve stem, a hollow one piece working valve barrel, said stem having limited vertical motion within said working barrel, a reduced section, a tapering conical portion adjacent the bottom of said reduced section for guiding the lower end of said valve stem to its relative position in said working barrel.

2. In a reciprocatory tubular valve, a solid one piece valve stem, a hollow one piece working valve barrel, said stem having limited vertical motion within said working barrel, a tapering portion for guiding the lower end of said stem to its relative position in said working barrel, a ground conical shaped valve seat of a shorter and enlarging dimension, greater than the inner diameter of said working barrel, a knurled cylindrical portion adjacent the said ground valve seat, a hexagonal portion for gripping same while assembling.

3. In a reciprocatory tubular valve, a solid one piece valve stem, a hollow one piece working valve barrel, said stem having limited vertical motion within said working barrel, said barrel having suitable rectangular openings near its upper end for the emission of fluids from within the said barrel, said openings tapering outwardly and upwardly at their upper ends, and inwardly at their lower ends.

4. In a reciprocatory tubular valve, a solid one piece valve stem, a hollow one piece working barrel, said stem having limited vertical motion within said working barrel, said barrel having suitable openings near the upper end, a plurality of stacked packing elements equidistantly disposed along the outer wall of said working barrel with separators, insuring the equidistance of the said stacked packing elements, and held in place by a hexagonal member having screw threaded engagement near the upper end of said working barrel.

5. In a reciprocatory tubular valve, a solid one piece valve stem, a hollow one piece working valve barrel, said stem having limited vertical motion within said working barrel, said barrel having an enlarged portion at the lower end with an angular shoulder for the support of packing elements and spaces, a parallel wall of lesser dimension for aligning said packing elements, terminating in a reduced section at the upper end of said working barrel to allow for their removal.

6. In a combination reciprocatory tubular valve, a solid one piece valve stem, a hollow one piece working valve barrel, said stem having free rotary reciprocation within said working barrel, said rotary and reciprocatory motion allowing the seats of the valve stem and the valve barrel to grind themselves together, thereby discharging any foreign matter collected therein, said stem and said barrel both having vertical motion within a well barrel, means for aligning the said stem with the axis of the working valve barrel and keeping it from contact with the walls of the well barrel, means for varying the number of packing elements without changing the vertical reciprocation of the valve stem within the working barrel, the valve stem and working valve barrel so constructed that no part, if detached, could pass downward into the lower check valve at the bottom of the well.

In testimony whereof I hereunto affix my signature.

SAM PLEDGER.